United States Patent
Zavolzhskiy et al.

(10) Patent No.: US 9,228,424 B2
(45) Date of Patent: Jan. 5, 2016

(54) METHOD OF TREATING THE NEAR-WELLBORE ZONE OF THE RESERVOIR

(75) Inventors: Victor Borisovich Zavolzhskiy, Moscow (RU); Vladimir Antonovich Burko, Moscow (RU); Albert Raisovich Idiytullin, Troizk (RU); Valery Ottovich Meyntser, Elektrogorsk (RU); Anatoly Ivanovich Platov, Elektrogorsk (RU); Yuri Georgeevich Serkin, Mitishi (RU)

(73) Assignee: RIVERBEND, S.A., Luxembourg (LU)

( * ) Notice: Subject to any disclaimer, the term of this patent is extended or adjusted under 35 U.S.C. 154(b) by 401 days.

(21) Appl. No.: 13/149,558

(22) Filed: May 31, 2011

(65) Prior Publication Data

US 2012/0305255 A1 Dec. 6, 2012

(51) Int. Cl.
| | | |
|---|---|---|
| *E21B 43/26* | (2006.01) | |
| *C09K 8/64* | (2006.01) | |
| *C09K 8/66* | (2006.01) | |
| *C09K 8/70* | (2006.01) | |
| *C09K 8/72* | (2006.01) | |

(52) U.S. Cl.
CPC . *E21B 43/26* (2013.01); *C09K 8/64* (2013.01); *C09K 8/66* (2013.01); *C09K 8/70* (2013.01); *C09K 8/72* (2013.01)
USPC ........................................ 166/261; 166/308.2

(58) Field of Classification Search
None
See application file for complete search history.

(56) References Cited

U.S. PATENT DOCUMENTS

| | | | | |
|---|---|---|---|---|
| 2,987,389 | A * | 6/1961 | Proell et al. ..................... | 149/60 |
| 3,044,912 | A * | 7/1962 | Proell et al. ..................... | 149/60 |
| 3,222,232 | A * | 12/1965 | Schwoyer ........................ | 149/41 |
| 3,270,815 | A * | 9/1966 | Osborn et al. ................. | 166/299 |
| 3,377,909 | A * | 4/1968 | Grant et al. ................... | 86/20.15 |
| 3,454,437 | A * | 7/1969 | Kishi et al. ..................... | 149/21 |
| 3,456,589 | A * | 7/1969 | Slykhouse et al. ............. | 102/313 |
| 3,462,324 | A * | 8/1969 | Grant et al. ....................... | 149/2 |
| 3,713,487 | A * | 1/1973 | Lozanski .................... | 166/280.1 |
| 3,759,574 | A * | 9/1973 | Beard ............................... | 299/4 |
| 4,396,530 | A | 8/1983 | Duke | |
| 4,903,772 | A * | 2/1990 | Johnson ........................ | 166/299 |
| 5,183,581 | A | 2/1993 | Khalil et al. | |
| 5,566,760 | A * | 10/1996 | Harris ......................... | 166/308.6 |
| 6,488,086 | B1 | 12/2002 | Daragan et al. | |
| 8,387,697 | B2 | 3/2013 | Alexandrov et al. | |
| 2003/0037692 | A1 * | 2/2003 | Liu ................................ | 102/301 |
| 2005/0269100 | A1 * | 12/2005 | Farabee et al. .............. | 166/308.1 |
| 2007/0056462 | A1 * | 3/2007 | Bates et al. .................... | 102/476 |
| 2008/0289828 | A1 * | 11/2008 | Hutchins et al. ............ | 166/308.3 |
| 2013/0206400 | A1 | 8/2013 | Alexandrov et al. | |

FOREIGN PATENT DOCUMENTS

| | | |
|---|---|---|
| RU | 640023 | 12/1978 |
| RU | 2064576 | 7/1996 |
| RU | 2100583 | 12/1997 |
| RU | 2126084 | 2/1999 |
| RU | 2154733 | 8/2000 |
| RU | 2009115499 A | 10/2010 |
| WO | WO9961395 | * 12/1999 |
| WO | 2010043239 | 4/2010 |
| WO | 2012025150 | 3/2012 |

OTHER PUBLICATIONS neogran.com.ua (Ukraine) webpage excerpts for the company "НЕОГРАНГраh" regarding urea-ammonium mixture fertilizers ("CAS" or "КАС"). Last viewed (and translated with Google Translation) Feb. 28, 2011. 5 pages.
tasman.com.ua (Ukraine) webpage excerpts for the company "ТАСМАН" regarding Carbamide-ammonium mixture (CAS) liquid fertilizers. Last viewed (and translated with Google Translation) Feb. 28, 2011. 8 pages.
Mischenko, I.T., Well oil production. Oil and Gas. UDC 622.276.5, 6 page excerpt in Russian Language (title page, pp. 253-256 and p. 815 (References)). An English translation is being provided of the title page, Section 5.10 (appearing on pp. 253-256) and the list of references (appearing on p. 815)(3 pages), 2003.
Zavolzhskii, Viktor et al.—related U.S. Appl. No. 14/090,928; 1st Non-Final Office Action dated Mar. 5, 2015 (16 pages).
Zavolzhskii, Viktor et al.—related U.S. Appl. No. 14/090,928; Final Office Action dated Oct. 22, 2015 (15 pages).

* cited by examiner

*Primary Examiner* — Kevin Flynn
*Assistant Examiner* — Anuradha Ahuja
(74) *Attorney, Agent, or Firm* — Gordon G. Waggett, P.C.

(57) ABSTRACT

The invention describes a method for treating near-wellbore zones involving the steps of injecting a magnesium metal with a catalyst into the desired area of the formation to be treated. Subsequently, combustive-oxidizing solution (COS) is injected into the zone of the formation to be treated. The COS initially reacts with the magnesium, which in turn initiates a vigorous oxidation reaction of the COS. The reaction gases and heat produced by the COS oxidation reaction are harnessed to enhance the productivity of the well by creating fractures in the treatment zone and by melting of paraffin and resin deposits in the treatment zone. As a final step, acid is injected into the formation to react with the formation thereby further enhancing the porosity of the fractures. In one embodiment, the COS uses ammonium nitrate as the oxidizer, and in another, urea or ethylene glycol may be added as a reaction fuel.

24 Claims, No Drawings

METHOD OF TREATING THE NEAR-WELLBORE ZONE OF THE RESERVOIR

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of Use

The invention is associated with the oil and gas industry, in particular with the methods of near-wellbore treatment of a reservoir to enhance fluid production. The proposed reservoir treatment creates secondary multidirectional fractures in treated intervals. This increases the permeability of the near-wellbore zone of the reservoir and its productivity in the extraction of oil, gas, gas-condensate, injection thermal and other mineral waters.

2. Background Technology

Various means of treating the near-wellbore zone of the reservoir using the technology of thermo-acidic treatment of the near-wellbore zone of the reservoir are known.

For example, existing technology is using thermal energy created through the interaction of solutions of HCl and metal magnesium (Mishchenko. I. T. Well production. Oil and Gas. 2007, UDC 622.276.5 p. 253-256). This technology reaction between magnesium and hydrochloric acid occurs in a well bore with the release of thermal energy. Temperature increase of the hydrochloric acid and the reservoir promote melting of the paraffin and resin deposits and their removal from the near well bore zone.

After dissolving paraffin-resin deposits through an increase in effective temperature, the residual, partially spent acid solution, that is left from the reaction with magnesium, continues to dissolve soluble formation material. This will effectively increase the size of existing channels. However, this method has a number of significant disadvantages:

(1) Low temperature and the washing abilities of acid, which are insufficient to create channels and fractures in the reservoir;
(2) The acid concentration in solution decreases after the reaction with magnesium;
(3) Reduction of acid concentration lowers its effectiveness in dissolving near wellbore formation;
(4) The acidic solution has relatively low washing abilities necessary to change the wettability and to remove the paraffin-resinous rock deposits; and
(5) Acid impacts only channels and fractures existent at the time of treatment.

The closest in the technical sense to the claimed technology is the method of thermochemical treatment of the near well bore formation zone by pumping a suspension of granulated magnesium and ammonium nitrate in an oil-based fluid into this zone, with the subsequent injection of hydrochloric acid solution into the reservoir such as taught in USSR Patent No. SU640023 to Abdulin et al., 1978-12-30. As described in SU640023, the hydrochloric acid reacts with magnesium, thus increasing the temperature of the acid and initiating the decomposition of ammonium nitrate. The main sources of heat in the this technology are: the reaction of magnesium with hydrochloric acid, the decomposition of ammonium nitrate and the final stage of processing where combustion of hydrogen and nitric oxide is possible. The disadvantages of the method in SU640023 are:

(1) The acidic component reacts with magnesium, thus lowering the concentration of hydrochloric acid, and hence the activity in interaction with the formation;
(2) High temperature is required for the decomposition of ammonium nitrate. Therefore, increasing the temperature will require a large consumption of acid and there is a high probability of failure to heat ammonium nitrate until decomposition; and
(3) The final stage of the process involves the explosion of a gas mixture of hydrogen and oxygen, which could adversely affect the condition of the cement isolation and casing of the treated intervals.

Therefore, it is a technical objective of the present invention to provide a method that will improve the effect of the near-wellbore zone treatment, while ensuring the safety of the process.

SUMMARY OF INVENTION

The invention relates to the oilfield industry, in particular, to methods for treatment of the near-wellbore zone, and can be used to increase the effective permeability of the near-wellbore zones and the productivity of the reservoir for the extraction of oil, gas, gas-condensate, thermal and other mineralized waters. The purpose of this invention is to create a method to enhance the productivity of the near-wellbore zone without compromising the safety of the process.

The method of treating near-wellbore zones of the present disclosure involves the injection of magnesium metal with a catalyst and the subsequent injection of combustive-oxidizing solution (COS) and the acid solution.

In one embodiment of the method of well treatment of the present invention, at the early stage of treatment a mixture of magnesium, water-insoluble catalyst and proppant is pumped in the treated area of the reservoir with the oil- or water-based fracturing fluids. Then in the treated area of the reservoir a combustive-oxidizing solution containing a surfactant and a water-soluble catalyst is pumped. The catalyst initiates the process and reduces the temperature required for the initial decomposition reaction of COS. Afterwards the treatment is followed by the injection of an acid solution.

In another embodiment of the present invention there is described a method of treating the near-wellbore formation zone of a geological reservoir comprising the following steps: (a) delivering a mixture of granular magnesium and water-insoluble catalyst to a desired treatment area within the near-wellbore zone; (b) delivering a combustive-oxidizing solution (COS) to the desired treatment area, the COS being capable of reacting with the magnesium; (c) permitting the COS to react with the magnesium in the treatment area to increase the temperature and initiate the exothermic oxidation reaction of the COS; (d) creating a localized zone of high pressure and high temperature in the treatment area from the COS oxidation reaction gases and heat; and (e) creating newly-formed fractures in the treatment area of the formation with the pressure resulting from the creation of said reaction gases.

This method may be followed with the additional steps of: (f) after completion of the COS oxidation reaction, injecting an acidizing solution into the now heated newly-formed fractures in the treatment area of the formation; and (g) producing the well to remove post-reaction products. The acidizing solution may comprise a water-based solution of hydrogen chloride (HCl). The acidizing solution may further comprise a surfactant.

In this method, the granular magnesium and the catalyst may be delivered along with a proppant during a fracturing operation. The magnesium and catalyst may be delivered into the formation in an oil- or water-based fracturing fluid.

In another embodiment of the present invention there is described a method for fracturing the near-wellbore formation zone of a geological reservoir comprising the following steps: (a) injecting into a desired near-wellbore treatment zone of the reservoir a hydraulic fracturing fluid containing a mixture comprising granular magnesium and a water-insoluble catalyst; (b) injecting into the treatment zone a combustive-oxidizing solution (COS); (c) contacting the magnesium and water insoluble catalyst in the treatment zone with the COS; (d) initiating an exothermic decomposition of the COS in the treatment zone to generate COS decomposition reaction gases and heat to cause a localized buildup of high pressure and high temperature, wherein the high pressure is sufficient to cause additional fracturing of the formation in the treatment zone; (e) after the COS decomposition reaction is substantially complete, injecting an acidizing solution (preferably with a surfactant) into the area of additional fracturing; and (f) producing the well to remove post-reaction products.

The COS used in the methods of the present invention preferably comprises an aqueous mixture of an oxidizer, a fuel, a surfactant, and a catalyst. In one embodiment, the oxidizer is ammonium nitrate. The fuel may be selected from the group consisting of urea and ethylene glycol and the like.

Another embodiment describes a method of treating the near-wellbore formation zone of a geological reservoir comprising the following steps: (a) delivering a dry form of a nitrate salt with proppant to a desired treatment area within the near-wellbore zone; (b) delivering a granular magnesium to the treatment area with proppant; (c) delivering a combustive-oxidizing solution (COS) to the treatment area, the COS capable of reacting with the magnesium; (d) permitting the COS to react with the magnesium in the treatment area to increase the temperature and initiate the exothermic oxidation reaction of the COS; (e) creating a localized zone of high pressure and high temperature in the treatment area from the COS oxidation reaction gases and heat; and (f) creating newly-formed fractures in the treatment area of the formation with the pressure resulting from the creation of said reaction gases. In this method, the COS preferably comprises a mixture of low concentration acid and ethylene glycol. A non-soluble catalyst is preferably delivered along with the nitrate salt or granular magnesium. The non-soluble catalyst is preferably a copper salt capable of being solubilized in the presence of the COS.

The nitrate salts used in connection with the present invention may be ammonium nitrate or sodium nitrate.

In another embodiment of the present invention, ammonium nitrate may be pumped into the treatment zone of the reservoir as a dry additive with proppant. A granulated magnesium is then pumped into the treatment zone with proppant. After the proppant, magnesium and ammonium nitrate are placed in the treatment zone of the reservoir, a mixture of low concentration acid and ethylene glycol will be used as the COS and will be pumped into the treatment zone.

Another embodiment of the present invention comprises the placing of magnesium inside of a reservoir fracture with proppant, and then using COS as a fluid, sodium nitrate as an oxidizer and copper salt as a catalyst.

In one embodiment, a non-soluble copper salt is employed, which will only become solubilized in the presence of the acid.

In one embodiment, the oxidizer is ammonium nitrate in a percent composition range between about 50% to about 65%; the fuel is urea in a percent composition range of about 10% to about 30%; the surfactant is in a percent composition range of about 2% to about 3%; the catalyst is in a percent composition range of about 3% to about 6%; and the remaining percent composition comprises fresh water.

In another embodiment, the COS further comprises an acid in a percent range between about 1% to about 3%; the oxidizer is ammonium nitrate in a percent composition range between about 52% to about 62%; the fuel is ethylene glycol in a percent composition range of about 8% to about 15%; the surfactant is in a percent composition range of about 2% to about 3%; the catalyst is in a percent composition range of about 3% to about 6%; and the remaining percent composition comprises fresh water.

In one embodiment of the present method, the fracturing fluid may also comprise proppant.

DETAILED DESCRIPTION OF INVENTION

The above general description and the following detailed description are merely illustrative of the subject invention and additional modes, advantages and particulars of this invention will be readily suggested to those skilled in the art without departing from the spirit and scope of the invention.

According to the invention, a mixture of magnesium, catalyst, and proppant is injected into the treated zone of the reservoir with hydraulic fracturing fluids (oil-based or water-based). After fracturing is completed a combustive-oxidizing solution (COS) is pumped into the treated area of the reservoir, followed by the injection of an acid solution.

Oxidation of COS is not an explosion; instead it is a process of decomposition and reacts continuously for 5-10 seconds. This excludes the explosive impact to the casing and cement of the well. At the same time, the generated gases and vapors of acids and fluid create (at some distance from the wellbore) a localized pressure of 500-800 atmospheres in the near-wellbore zone, which is necessary for the formation of a network of fractures around the area of the thermo-acidic reaction. The acidic compound is subsequently injected into the well at the required concentration and reacts only with the formation; the acid solution is not consumed by the reaction with magnesium.

A catalyst is added to the composition of COS, which reduces the temperature required to initiate the oxidative reaction. This composition also preferably contains a surfactant, which facilitates the removal of hydrocarbon films from the magnesium, and therefore for the reaction between the COS and magnesium.

Through research, the required material quantities, that are sufficient for a controlled process, were determined:

(1) Amount of COS necessary to heat the formation and to create fractures in the treated zone can be calculated by the following formula:

$$M_{COS} = (30-150)*H + 200 \text{ kg}$$

where $M_{COS}$ is the mass of combustive-oxidizing solution in kg;

H is the thickness of the reservoir in meters;

30-150 is the Coefficient as determined by a core analysis in the laboratory.

(2) The amount of magnesium necessary for the initial oxidation reaction of COS can be calculated by the following formula:

$$M_{Mag.} = (0.05\text{--}0.15)\, M_{SES}$$

where M Mag is the mass of magnesium in kg;
MCOS is the mass of COS in kg.

(3) The mount of acid composition is calculated by the following formula:

$$V_{acid} = (700\text{--}1300)*H$$

where V acid is the volume of acid composition in liters;
H is the thickness of the reservoir in meters.

The minimum values are taken for low-permeability of the reservoir (no more than 0.04 μm2), and then maximum values are used for the permeability of more than 0.25 μm2.

In one embodiment of the present invention, the near well bore treatment is performed in three stages. Initially, granulated magnesium and catalyst is pumped into the formation with fracturing fluids, including proppant, during the fracture treatment. Second, a combustive-oxidizing solution (COS) is injected into the near well-bore zone, wherein the COS contains oxidizer, fuel, surfactant, and a catalyst. Third, when the thermo-acidizing treatment is completed, acid is pumped into the near-well bore zone.

Magnesium is actively reacting with the COS, increasing its temperature to 200-250° C., a temperature range that is sufficient to initiate the reaction of oxidation of the COS. Availability of fuel (e.g., urea or ethylene glycol) in the COS will also improve reaction efficiency by increasing the volume of gas and increasing the temperature of the process through the duration of the oxidizing reaction. Heat from the reaction of magnesium and the COS and catalyst, initiates the reaction of the decomposition of the oxidizer and the subsequent intense oxidation reaction:

$$2NH_4NO_3 + CO(NH_2)_2 \rightarrow 8H_2O + 4N_2 + CO_2 + 3810\ kJ/kg$$

with the release of large quantities of gaseous products and heat.

The oxidation reaction of COS in accompanied by a sharp increase in pressure and temperature, which leads to the formation (some distance from the wellbore) of a wide zone of fracture networks. The reaction heats and melts paraffin and resinous deposits in the zone of reaction.

COS used in this type of treatment can have one of the following compositions in percentages:

Composition #1:

| | |
|---|---|
| Oxidizer- ammonium nitrate - | 50-65 |
| Fuel-urea - | 10-30 |
| Surfactant - | 2-3 |
| Catalyst - | 3-6 |
| Fresh Water - | the rest |

Composition #2:

| | |
|---|---|
| Oxidizer-ammonium nitrate | 52-62 |
| Fuel-ethylene glycol | 8-15 |
| Surfactant - | 2-3 |
| Catalyst - | 3-6 |
| Acid (hydrochloric, nitric) - | 1-3 |
| Fresh Water - | the rest |

Composition #3:

| | |
|---|---|
| KAC-32 TY 2181-629-00209023 - (KAC-32 is the Russian language designation for CAS - Carbamide Ammonium mixtures. CAS is a liquid fertilizer solution of urea (carbamide) and ammonium nitrate where the nitrogen concentration is typically about 28%-32%. TY 2181-629-00209023 is the Russian Technical Number for this product). | 91-95 |
| Surfactant - | 2-3 |
| Catalyst - | 3-6 |

After the completion of the oxidizing reaction, the acid solution (AS) is pumped through the created fractures, while passing through an area of high temperature, is heated, and thus increases the efficiency of the acid effect on the formation. The surfactant (added) within the acidic composition improves its washing abilities of oil deposits and rock dissolution. This leads to an increase in the size of the fractures and channels, which in the future will function as transport channels for the inflow of production from the reservoir to the well bore.

The Acid Solution (AS) contains the components in the following ratio in %:

| | |
|---|---|
| Hydrogen chloride - | 12-15 |
| Surfactant - | 2-3 |
| Mix Water - | the rest |

The resulting acidic solution and processed vertical and horizontal fractures greatly increase well productivity and facilitate the uniform development of the reservoir.

The percentages herein are typically calculated on a per weight basis for dry ingredients, and on a percent volume basis for liquids.

In the method proposed in the present invention, unlike with the existing technology, the main sources of heat and pressure required for the formation of fractures are: the reaction of magnesium with the combustive-oxidizing solution that initiates and supports the oxidation of COS and the oxidation of COS itself. The injected catalysts are the initiators of the decomposition reaction of COS, as well as being a catalyst, they greatly reduce the temperature required to initiate the oxidation reaction of COS. Thus, consistent (separate) delivery of the magnesium, COS, acid solution, with surfactant, and catalysts into the treated zone, increases the effectiveness and safety of the treatment.

Features of the Invention are as Follows:
(1) The use of magnesium for the initial rise in temperature to initiate the oxidation of COS;
(2) Remote and discrete delivery of magnesium together with the proppant at some distance from the wellbore using fracturing fluids;
(3) Using the COS to raise the temperature and the formation of fractures in a remote area of the reservoir;
(4) The reaction taking place in a remote area of the borehole;
(5) Acid solution is used for direct impact on the formation and not to raise the temperature in the reaction with magnesium;
(6) The creation of fracture not with the use of an explosion, but as a result of an oxidation reaction of COS;
(7) Introduction of catalysts to the COS to initiate the decomposition reaction of COS and lower values of the temperature required to initiate the reaction of oxidation in a porous environment; and
(8) Addition of the surfactant to the COS, significantly activates the reaction of magnesium with the COS.

Feature 1 is common and analogous with the existing technology, while features 2-8 are distinctive features of the present invention.

In one embodiment of the present invention, the proposed method is implemented as follows.

Stage 1: In the first stage the magnesium and the water-insoluble catalyst are delivered to a remote location at some distance from the wellbore, and within the formation zone. In the situation where the near-wellbore zone has fractures or cavities, the magnesium is delivered to the reservoir in oil suspension. If the zone has no fractures or cavities, they are created using preliminary hydraulic fracturing, which is more cost effective than large-volume hydraulic fracturing. Fracturing fluid is oil- or water-based. Granular magnesium is pumped into the first or subsequent portions of proppant.

Stage 2: In the second stage a pre-prepared solution of COS is delivered (pumped) to the zone of magnesium placement, where it actively reacts with magnesium, which leads to an increase in temperature and the beginning of the oxidation reaction of COS, thus causing an increase in pressure and the formation of multiple fractures within the reservoir.

At the end of the oxidation reaction, the acidic composition is pumped through the newly created fracture network.

To implement the proposed method, standard hydraulic fracturing and acid treatment surface and subsurface equipment is used.

Modeling of the claimed method is performed in a special apparatus with the bulk samples, which contain quartz sand saturated with oil, with water in the porous space.

The exothermic reaction occurring in the simulation process will develop a sharp increase in pressure (more than 30 MPA above the initial pressure) and temperature (above 400° C. from the initial static temperature).

For comparison of parameters of thermochemical processes, the modeling of the process described in the existing technology was conducted (as described in SU640023 to Abdulin). In the presence of granular magnesium and ammonium nitrate and a porous environment, and with the subsequent addition of acid, the pressure increases to 6 mPa and the temperature reaches 200° C.

The method claimed in the present invention is effective and safe. It requires standard equipment and standard technology to pump magnesium, COS, and the acidic component into the reservoir.

The method of the present invention allows an improvement in the effective permeability of the reservoir (e.g., sediment, carbonate, shale, coal, and volcanic rock) due to the formation of additional fractures and an increase in capacity of the existing natural fracture network, or the fracture network created by hydraulic fracturing.

This method can be used in any geographic region of the extraction of oil, gas, thermal and other deposits.

EXAMPLE 1

The well has the following geological and technical data:

| | |
|---|---|
| Depth | 2500 m. |
| Net height | 12 m |
| Reservoir pressure | 24 mPa. |
| Formation permeability | 0.15 mkm2. |
| Reservoir temperature | 36 C.° |
| Oil saturation | 80% |
| Flow rate before treatment | 4 tons/day. |
| Perforation interval | 2475-2487 m. |

The reservoir is carbonate rock.

The decision is made to perform the near-wellbore zones treatment by using hydraulic fracturing and the Thermo-Pressure-Chemical Treatment (TPCT) of the reservoir. Well testing was done prior the treatment to determine the characteristics of the reservoir. A typical completion was inserted into the well, a "Packer" was set at a depth of 2,430 m. Hydraulic fracturing was performed using standard techniques with injection of 10 tons of proppant. During the fracturing treatment within the first stage, of proppant volume (1700 kg), 300 kg of granulated magnesium (grains size of 0.5-1.5 mm) was added. After the completion of hydraulic fracturing, the COS was prepared.

The volume of COS is determined using the formula:

MSES=(30–150)*H+200 kg

110*12+200=1520 liters

Composition of COS:

| | |
|---|---|
| Ammonium nitrate | 840 kg |
| Urea | 180 kg |
| ML-81B | 45 kg |
| Water-soluble copper salt | 60 kg |
| Fresh Water | up to 1520 kg |

Parameters of COS were defined in the field lab. Density of solution should be at least 1.42 $g/cm^3$. The amount of magnesium was determined by the formula:

M Mag=(0.05–0.5)*M COS

M Mag=0.2*1520=300 kg 1,070 liters of prepared COS and 6,150 liters of displacement fluid were circulated into the well. Packer was set and COS and 3000 lt of displacement fluid was injected into formation where magnesium was placed during the treatment.

Treatment parameters were recorded. Treating pressure increased up to 400 atm, at the end of COS injection stage. After pumping was stopped pressure declined to 270 atm within 5 minutes and then remained constant for 1 hour. A pressure can drop to 0 atm (dependent on the current reservoir pressure). During the monitoring of the oxidative reaction, hydrochloric acid was prepared. The volume of hydrochloric acid solution was calculated using the formula:

V acid=(700–1300)*H

V acid=834*12=10000 liters.

The composition of the hydrochloric acid solution:

| | |
|---|---|
| 1. Hydrochloric acid, inhibited (24%) | 6,250 liters. |
| 2. Surfactant | 300 liters |
| 3. Technical water | up to 10000 liters |

After pressure decrease (which indicates the end of oxidation reaction), the wellhead was rigged down, the packer unset, 7,300 liters of hydrochloric acid solution was circulated, the packer was set and the remaining 2,500 liters of hydrochloric acid solution and 25,000 liters of the displacement fluid was injected into reservoir.

When the last 5,000 liters were pumped, the injectivity of the well was determined. Considering that the treated zone has higher than normal temperature and that active reaction had occurred, the well was produced (by swabbing) for removal of post-reaction products. After treatment, well testing is required to determine subsurface equipment requirements.

EXAMPLE 2

It was decided to conduct Thermo-Pressure-Chemical Treatment (TPCT) in a production reservoir, presented by sandstone. The well has the following geological and technical data:

| | |
|---|---|
| Depth | 2000 m |
| The productive capacity of the reservoir | 8 m. |
| Reservoir pressure | 170 mPa. |
| Formation permeability | 0.12 um2. |
| The temperature of the reservoir | 32 C.° |
| Oil saturation | 70% |
| Flow rate of the well to the treatment | 8 tons/day. |
| Perforation interval | 1887-1895 m. |
| Reservoir type | sandstone |

Well testing was done prior the treatment to determine the characteristics of the reservoir.

It was decided to perform fracturing treatment with placement of 8,000 kg of proppant followed by TPCT.

Determination of the amount of COS needed for the TPCT and the amount of magnesium that need to be added to the first proppant stage.

Required amount of COS can be determined by the formula:

$$M\ COS = (30-150) * N + 200\ kg$$

$$M\ COS = 100 * 8 + 200 = 1000\ kg$$

Composition of the COS:

| | |
|---|---|
| KAC-32 TY 2181-629-00209023 | 93% |
| Surfactant | 3% |
| Catalyst | 4% |

COS properties were determined in field lab.
COS density was determined 1.38 g/cm.

Amount of magnesium required for the treatment is determined by the formula $$M\ Mag = 0.25 * 1000 = 250\ kg$$

Fracturing treatment was performed and 8,000 kilograms of proppant was placed. 250 kg of magnesium was added to the first proppant stage.

758 liters and 4800 liters of brine were circulated. After the packer was set, COS and 3000 liters of brine was injected into the formation where magnesium (TPCT) was placed.

After injection was completed, the recorded pressure rose to 350 atm for 5 minutes, followed by a drop to 240 atm which remained constant for 0.5 hours, and then decreased to 0 atm.

During the monitoring of oxidative reaction, hydrochloric acid solution was mixed.

The volume of acid solution can be calculated by the formula:

$$V\ acid = (700-1300) * H$$

$$V\ acid = 1000 * 8 = 8000\ liters$$

The composition of the acid solution:

| | |
|---|---|
| Inhibited Hydrochloric acid (18%) | 97% |
| Surfactant | 3% |

After pressure decrease (which indicates the end of oxidation reaction) following was performed: Wellhead rigged down, Packer unset, 5,600 liters of hydrochloric acid solution circulated, Packer set and remaining 2,400 liters of hydrochloric acid solution and 15,000 liters of the brine was injected into reservoir.

When the last 5,000 liters were pumped, the injectivity of the well was determined. Considering that treated zone has higher than normal temperature and that active reaction had occurred the well was produced (by swabbing) for removal of post-reaction products. After treatment, well testing is required to determine subsurface equipment requirements.

In another embodiment of the present invention, the ammonium nitrate or other nitrate salt such as sodium nitrate may be pumped into the treatment zone of the reservoir as a dry additive with proppant. A granulated magnesium is then pumped into the treatment zone with proppant. After the proppant, magnesium and ammonium nitrate are placed in the treatment zone of the reservoir, a mixture of low concentration acid and ethylene glycol will be used as the COS and will be pumped into the treatment zone.

As disclosed herein, one embodiment of the present invention comprises the placing of magnesium inside of a reservoir fracture with proppant, and then using COS as a fluid, sodium nitrate as an oxidizer and copper salt as a catalyst.

In one embodiment, a non soluble copper salt catalyst is employed, which will only become solubilized in the presence of the acid. This non-soluble catalyst can be delivered to the treatment area along with the nitrate salt or granular magnesium.

It will also be understood by one of ordinary skill in the art having the benefit of the present disclosure that the various components of the present invention may be formulated in liquid and/or dry phases, and the equivalent percentages can be calculated.

It will also be understood by one of ordinary skill in the art having the benefit of the present disclosure that the order of delivery of the various components into the treatment zone of the formation may be varied to achieve the desired in-situ reaction.

This specification is to be construed as illustrative only and is for the purpose of teaching those skilled in the art the manner of carrying out the invention. It is to be understood that the forms of the invention herein shown and described are to be taken as the presently preferred embodiments. As already stated, various changes may be made in the shape, size and arrangement of components or adjustments made in the steps of the method without departing from the scope of this invention. For example, equivalent elements may be substituted for those illustrated and described herein and certain features of the invention may be utilized independently of the use of other features, all as would be apparent to one skilled in the art after having the benefit of this description of the invention. Further modifications and alternative embodiments of this invention will be apparent to those skilled in the art in view of this specification.

We claim:

1. A method of treating a near-wellbore formation zone of a geological reservoir comprising the following steps:
    a. delivering a mixture of granular magnesium and catalyst to a desired treatment area within the near-wellbore formation zone;
    b. delivering a combustive-oxidizing solution (COS) to the desired treatment area, the COS capable of reacting with the magnesium;
    c. permitting the COS to react with the magnesium and the catalyst in the treatment area to increase the temperature and initiate an exothermic oxidation reaction of the COS, whereby the COS is decomposed without an explosion due to the catalyst and the catalyst reduces the temperature required to initiate the exothermic oxidation reaction of the COS to produce COS oxidation reaction gases and heat;

d. creating a localized zone of high pressure and high temperature in the treatment area from the COS oxidation reaction gases and heat; and e. creating newly-formed fractures in the treatment area of the near-wellbore formation with the pressure resulting from the COS oxidation reaction gases.

2. The method of claim 1 further comprising the steps of:

f. after completion of the COS oxidation reaction, injecting an acidizing solution into the newly-formed fractures in the treatment area of the formation; and g. producing from the reservoir to remove post-reaction products.

3. The method of claim 2 wherein the acidizing solution comprises a water-based solution of hydrogen chloride.

4. The method of claim 3 wherein the acidizing solution further comprises a surfactant.

5. The method of claim 1 wherein the granular magnesium and the catalyst are delivered along with a proppant during a fracturing operation.

6. The method of claim 1 wherein the magnesium and catalyst are delivered in an oil- or water-based fracturing fluid.

7. The method of claim 1 wherein the COS comprises an aqueous mixture of an oxidizer, a fuel, and a surfactant.

8. The method of claim 7 wherein the oxidizer is ammonium nitrate.

9. The method of claim 7 wherein the fuel is selected from the group consisting of urea and ethylene glycol.

10. The method of claim 7 wherein the oxidizer is ammonium nitrate in a percent composition range between about 50% to about 65%; wherein the fuel is urea in a percent composition range of about 10% to about 30%; wherein the surfactant is in a percent composition range of about 2% to about 3%; wherein the catalyst is in a percent composition range of about 3% to about 6%; and wherein the remaining percent composition comprises fresh water.

11. The method of claim 7 wherein the COS further comprises an acid in a percent composition range between about 1% to about 3%; wherein the oxidizer is ammonium nitrate in a percent composition range between about 52% to about 62%; wherein the fuel is ethylene glycol in a percent composition range of about 8% to about 15%; wherein the surfactant is in a percent composition range of about 2% to about 3%; wherein the catalyst is in a percent composition range of about 3% to about 6%; and wherein the remaining percent composition comprises fresh water.

12. A method for fracturing a near-wellbore formation zone of a geological reservoir comprising the following steps:

a. injecting into a desired near-wellbore treatment zone of the reservoir a hydraulic fracturing fluid containing a mixture comprising granular magnesium and a catalyst;

b. injecting into the near-wellbore treatment zone a combustive-oxidizing solution (COS);

c. contacting the magnesium and the catalyst in the near-wellbore treatment zone with the COS;

d. initiating an exothermic decomposition of the COS in the near-wellbore treatment zone to generate COS decomposition reaction gases without an explosion due to the catalyst and the catalyst reduces the temperature required to initiate the exothermic decomposition of the COS, to produce COS oxidation reaction gases and heat to cause a localized buildup of high pressure and high temperature, wherein the high pressure is sufficient to cause additional fracturing of the near-wellbore formation zone in the near-wellbore treatment zone;

e. after the COS decomposition reaction is substantially complete, injecting an acidizing solution, into an area of additional fracturing; and f. producing from the reservoir to remove post-reaction products.

13. The method of claim 12 wherein the fracturing fluid further comprises proppant.

14. The method of claim 12 wherein the COS comprises an aqueous mixture of an oxidizer, a fuel, and a surfactant.

15. The method of claim 12 wherein the acidizing solution further comprises a surfactant.

16. A method of treating a near-wellbore formation zone of a geological reservoir comprising the following steps:

a. delivering a dry form of a nitrate salt with proppant to a desired treatment area within the near-wellbore zone;

b. delivering a granular magnesium to the treatment area with proppant;

c. delivering a catalyst to the treatment area;

d. delivering a combustive-oxidizing solution (COS) to the treatment area, the COS capable of reacting with the magnesium;

e. permitting the COS to react with the nitrate salt and the granular magnesium in the treatment area to increase the temperature and initiate an exothermic oxidation reaction of the COS, wherein the COS decomposes without an explosion due to the catalyst and the catalyst reduces the temperature required to initiate the exothermic decomposition of the COS to produce COS oxidation reaction gases and heat;

f. creating a localized zone of high pressure and high temperature in the treatment area from the COS oxidation reaction gases and heat; and g. creating newly-formed fractures in the treatment area of the near-wellbore formation with the pressure resulting from the COS oxidation reaction gases.

17. The method of claim 16 wherein the nitrate salt is ammonium nitrate or sodium nitrate.

18. The method of claim 16 wherein the COS comprises a mixture of acid and ethylene glycol.

19. The method of claim 16 wherein the catalyst is a copper salt.

20. The method of claim 16 wherein steps (a) and (b) are performed together so that the nitrate salt and granular magnesium are delivered together to the treatment area with proppant prior to step (d).

21. The method of claim 16 wherein steps (a), (b) and (c) are performed together so that the nitrate salt, granular magnesium and catalyst are delivered together to the treatment area with proppant prior to step (d).

22. The method of claim 16 wherein step (b) is performed before step (a).

23. The method of claim 16 wherein steps (a), (b) and (c) are performed in any order before step (d).

24. The method of claim 16 wherein the catalyst is added to the COS and steps (c) and (d) are therefore combined and performed together after steps (a) and (b).

* * * * *